US010303165B2

(12) United States Patent
Kim

(10) Patent No.: US 10,303,165 B2
(45) Date of Patent: May 28, 2019

(54) MOBILE COMMUNICATION TERMINAL HAVING UNMANNED AIR VEHICLE

(71) Applicant: Young Kwon Kim, Siheung-si (KR)

(72) Inventor: Young Kwon Kim, Siheung-si (KR)

(73) Assignee: Young Kwon Kim, Siheung-si, Gyeonggi-do ( * ) Notice: Subject to any disclaimer, the term of this patent is extended or adjusted under 35 U.S.C. 154(b) by 71 days.

(21) Appl. No.: 15/544,660

(22) PCT Filed: Feb. 12, 2016

(86) PCT No.: PCT/KR2016/001422
§ 371 (c)(1),
(2) Date: Jul. 19, 2017

(87) PCT Pub. No.: WO2016/137146
PCT Pub. Date: Sep. 1, 2016

(65) Prior Publication Data
US 2018/0046176 A1  Feb. 15, 2018

(30) Foreign Application Priority Data
Feb. 23, 2015  (KR) ........................ 10-2015-0024942

(51) Int. Cl.
*G05D 1/00* (2006.01)
*B64C 39/02* (2006.01)
(Continued)

(52) U.S. Cl.
CPC ......... *G05D 1/0016* (2013.01); *B64C 39/024* (2013.01); *B64C 39/028* (2013.01);
(Continued)

(58) Field of Classification Search
CPC ................ B64C 39/028; B64C 39/024; B64C 2201/127; B64C 2201/042;
(Continued)

(56) References Cited

U.S. PATENT DOCUMENTS 7,252,265 B2     8/2007 Perlo et al.
2017/0369164 A1* 12/2017 Klein ................... B64C 39/024
2018/0114451 A1*  4/2018 Foina ................... G08G 5/0026

FOREIGN PATENT DOCUMENTS

KR   10-2002-0070417 A   9/2002
KR   10-2012-0006160 A   1/2012
(Continued)

OTHER PUBLICATIONS

Money Today Network, Commercialization and Future Developments of "LTE drone of Korea" Smarter than "Drone", [online], Mar. 4, 2014 (http://news.mtn.co.kr/newscenter/newsviewer.mtn?qidx=201403415470389313).

*Primary Examiner* — Mussa A Shaawat
(74) *Attorney, Agent, or Firm* — Rabin & Berdo, P.C.

(57) ABSTRACT

The present invention relates to a mobile communication terminal having an unmanned air vehicle, the mobile communication terminal being smart-phones, tablet-phones, or tablet-PCs which are carried by users and used for mobile communication, and the unmanned air vehicle being kept in the mobile communication terminal or in various mobile communication terminals that may be developed in the future, and being capable of navigating and performing various operations according to a control using the mobile communication terminal. The present invention provides a mobile communication terminal having an unmanned air vehicle, which includes: an unmanned air vehicle including a flying means, a wireless communication means and an image capturing means; and a mobile communication terminal part including: a hangar part in which the unmanned air vehicle is kept; an unmanned air vehicle control means controlling the unmanned air vehicle to navigate and capture images through wireless communication with the unmanned air vehicle; and a manipulation part through which a control (Continued)

command of a user is input to the unmanned air vehicle control means.

6 Claims, 11 Drawing Sheets

(51) Int. Cl.
    *B64D 47/08*           (2006.01)
    *G08C 17/02*           (2006.01)

(52) U.S. Cl.
    CPC .............. *B64D 47/08* (2013.01); *G08C 17/02* (2013.01); *B64C 2201/027* (2013.01); *B64C 2201/042* (2013.01); *B64C 2201/066* (2013.01); *B64C 2201/108* (2013.01); *B64C 2201/127* (2013.01); *B64C 2201/141* (2013.01); *B64C 2201/146* (2013.01); *B64C 2201/201* (2013.01); *B64D 2211/00* (2013.01); *G08C 2201/32* (2013.01); *G08C 2201/91* (2013.01); *G08C 2201/93* (2013.01)

(58) Field of Classification Search
    CPC ........ B64C 2201/201; B64C 2201/146; B64C 2201/141; B64C 2201/108; B64C 2201/066; B64D 47/08; B64D 2211/00; G05D 1/0016; G08C 17/02; G08C 2201/93; G08C 2201/32; G08C 2201/91
    See application file for complete search history.

(56)           References Cited

FOREIGN PATENT DOCUMENTS

| | | |
|---|---|---|
| KR | 10-1116831 B1 | 3/2012 |
| KR | 10-1117207 B1 | 3/2012 |
| KR | 10-1450311 B1 | 10/2014 |

\* cited by examiner

MOBILE COMMUNICATION TERMINAL HAVING UNMANNED AIR VEHICLE

TECHNICAL FIELD

The present invention relates to a mobile communication terminal. More particularly, the present invention relates to a mobile communication terminal having an unmanned air vehicle, the mobile communication terminal being smart-phones, tablet-phones, or tablet-PCs which are carried by users and used for mobile communication, and the unmanned air vehicle being kept in the mobile communication terminal or in various mobile communication terminals that may be developed in the future, and being capable of navigating and performing various operations according to a control using the mobile communication terminal.

BACKGROUND ART

For a long time, unmanned air vehicles operated by using an radio control (RC) have been used for hobby and industrial or military services, and those unmanned air vehicles are controlled in close ranges by using an RC controller. Recently, unmanned aerial vehicles, called as drones, have been widely known for carrying out aerial photographing or air attack by remote control for military operations. Currently, the use of drones has been developed and has widely spread into use such as logistics delivery (delivery service), searching for missing persons and wildfire monitoring, tracking of vehicles used in crimes, observation of animals in danger of extinction, etc. In addition, in terms of the size of unmanned aerial vehicles, micro unmanned aerial vehicles called "nano drones" as well as large-sized drones that can be used for logistics delivery have been developed.

In addition, recently, these unmanned aerial vehicles have recently begun to attract a great deal of attention in commercial uses, along with techniques to control their operation by using mobile communication terminals such as feature-phones or smart-phones. Examples of related arts of controlling unmanned aerial vehicles by using feature-phones or smart-phones are disclosed in a patent document 1 and a patent document 2 of prior art documents. In other words, the patent document 1 (Korean Patent Application No. 10-2002-0070417, Publication Date: 9 Sep. 2002) discloses an radio control system for an unmanned aerial vehicle, the system using a mobile phone (cellular phone, PCS, IMT2000, etc.) including Bluetooth therein. In addition, in the patent document 2 (Korean Patent No. 10-1117207, Publication Date: 18 Jan. 2012), an unmanned aerial vehicle includes an electronic map, flight navigation points thereof are designated, and the unmanned aerial vehicle is controlled to automatically navigate along the flight navigation points. Herein, a communication system, a coordinate input system, and a manual/auto switching system are provided, so that a navigation track and a navigation state of the unmanned aerial vehicle are monitored by manually or automatically controlling the unmanned aerial vehicle through a smart-phone. As described above, the technique for controlling the unmanned aerial vehicle using a conventional feature-phone or smart-phone is widely known and commercialized.

DISCLOSURE

Technical Problem

As described above, various technologies and applications for unmanned aerial vehicles are currently being developed, and the use thereof is gradually increasing. In addition, in the control technology for unmanned aerial vehicles, technologies using a smart phone have been commercialized in succession to technologies using a conventional feature-phone. However, unmanned aerial vehicles are manufactured, and carried and transported as separate entities separately from mobile communication terminals such as smart-phones. In addition, mobile communication terminals are used as a control means for only controlling unmanned aerial vehicles. Accordingly, it is necessary to find a way to carry and move the unmanned aerial vehicle more easily and to find new ways of utilizing the mobile communication terminal.

Accordingly, the present invention has been made keeping in mind the above problems occurring in the prior art, and an object of the present invention is to provide a mobile communication terminal having an unmanned air vehicle, the mobile communication terminal keeping the unmanned air vehicle therein and being capable of easily carrying and moving the unmanned air vehicle, and easily and conveniently manipulating and controlling the unmanned air vehicle.

Technical Solution

In order to accomplish the above object, the present invention provides a mobile communication terminal having an unmanned air vehicle including: an unmanned air vehicle including a flying means, a wireless communication means, and an image capturing means; and a mobile communication terminal part including: a hangar part in which the unmanned air vehicle is kept. Herein, the a mobile communication terminal part includes: an unmanned air vehicle control means controlling the unmanned air vehicle to navigate and capture an image by wireless communication with the unmanned air vehicle; and a manipulation part through which a control command of a user being input to the unmanned air vehicle control means.

In the present invention, the hangar part may be provided in a rear part of the mobile communication terminal part and the mobile communication terminal part may further include a rear cover completely covering the rear part of the mobile communication terminal part, such that the hangar part is covered with the rear cover.

In the present invention, the hangar part may be provided in a rear part of the mobile communication terminal part and the mobile communication terminal part may further include a rear cover covering the rear part of the mobile communication terminal part, with a hangar cover provided in the rear cover to open and close the hangar part exclusively. Particularly, the hangar cover may be a sliding cover slidably covering the hangar part.

In the present invention, the unmanned air vehicle may further include: a battery supplying electric power to the flying means, the wireless communication means, and the image capturing means; and a solar power generation part charging the battery by solar generation.

In the present invention, the unmanned air vehicle may further include a universal subscriber identity module (USIM) storing subscriber information corresponding to mobile communication subscriber information of the mobile communication terminal part.

In the present invention, the image capturing means of the unmanned air vehicle may include at least one of a main camera capturing a general still image and video, a night vision camera obtaining an image of a target object using infrared light, and a thermo-graphic camera sensing heat emitted from a target object and obtaining a thermal image according to a temperature difference of the target object.

In the present invention, the unmanned air vehicle may further include a global positioning system (GPS) receiving flight positional information of the unmanned air vehicle and providing the received flying positional information to the mobile communication terminal part, and enabling the unmanned air vehicle to autonomously navigate according to a coordinate designation.

In the present invention, the unmanned air vehicle control means of the mobile communication terminal part may include an unmanned air vehicle control application program controlling a flight, image capturing, and processing captured image data of the unmanned air vehicle, and the manipulation part of the communication terminal part may include a display device displaying a touch screen for controlling the unmanned air vehicle when the unmanned air vehicle control application program is executed.

Advantageous Effects

The present invention configured as described above is capable of easily and conveniently carrying and moving an unmanned air vehicle in a state of being kept in a mobile communication terminal by configuring the mobile communication terminal to include a hangar part capable of keeping the unmanned air vehicle therein. In addition, manipulation or control of the unmanned aerial vehicle can be performed more easily and conveniently.

MODE FOR INVENTION

Exemplary embodiments of the present invention will now be described in detail with reference to the accompanying drawings. The present invention is not limited to the embodiments disclosed herein, but may be implemented in various different forms. These embodiments are provided to make the disclosure of the present invention complete and fully inform the scope of the present invention to a person of ordinary skill in the art to which the present invention pertains.

As shown in FIGS. 1 to 9, a mobile communication terminal provided for an embodiment of the present invention includes: an unmanned air vehicle 100; and a mobile communication terminal part 200 in which the unmanned air vehicle 100 is kept therein.

As the mobile communication terminal part 200 described in the present invention, smart-phones, tablet-phones, or tablet-PCs or various mobile communication terminals that may be developed in the future are used, and conventional feature-phones are also used. In addition, as the unmanned air vehicle 100 that is kept in the mobile communication terminal part 200, a micro unmanned air vehicle called as 'nano drone' at present is used.

Particularly, the mobile communication terminal part 200 includes a hangar part 210 at one part thereof, and the unmanned air vehicle 100 is kept in the hangar part 210. The unmanned air vehicle 100 is easily carried and moved by being kept in the hangar part 210 of the mobile communication terminal part 200. When necessary, a user may take out the unmanned air vehicle 100 from the hangar part 210 of the mobile communication terminal part 200, and perform a desired operation by manipulating the unmanned air vehicle 100 to navigate.

The hangar part 210 may be formed in any part of the mobile communication terminal part 200. In the present embodiment, considering the size and ease of storage the hangar part 210, the hangar part 210 is formed in a rear part of the mobile communication terminal part 200. A first battery 220 supplying electric power to the mobile communication terminal part 200 is mounted in the rear part of the mobile communication terminal part 200, thus it is preferable for the hangar part 210 to be formed at a position that does not cause interference with the mounted first battery 220. For example, when the first battery 220 is mounted at a lower side of the rear part of the mobile communication terminal part 200, then the hangar part 210 may be formed at an upper side of the rear part of the mobile communication terminal part 200.

Figure 11:
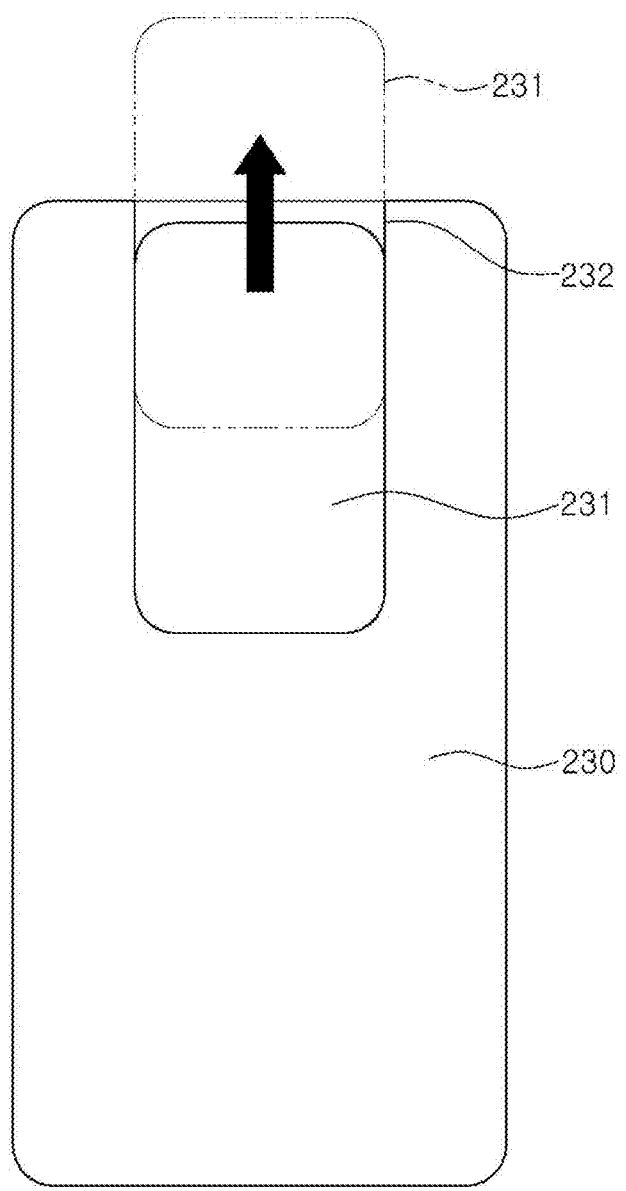
FIG. 11 is a view showing another example of a rear cover of the mobile communication terminal part of the present invention.

In general, a rear cover 230 that completely covers the rear part of the mobile communication terminal part 200 is engaged on the rear part of the mobile communication terminal part 200, so that the first battery 220 and other terminals are not exposed. Accordingly, the hangar part 210 may be also covered by the rear cover 230. However, it may cause inconvenience to the user to take out the unmanned air vehicle 100 from the hangar part 210 of the mobile communication terminal part 200 since the user has to completely disengage the rear cover 230 from the mobile communication terminal part 200 for the same. Thus, in addition to the rear cover 230, a second cover that covers only the hangar part 210 may be provided. However, in the present embodiment, in order to facilitate simultaneous engagement or disengagement of the rear cover 230 and the second cover against the rear part of the mobile communication terminal part 200, the second cover is provided to be integrated with the rear cover 230 as shown in FIG. 11, but the second cover may be configured to open and close only the hangar part 210 while the rear cover 230 being engaged to the rear part of the mobile communication terminal part 200. In other words, the second cover is called as a hangar cover 231. The hangar cover 231 may be formed to be engaged with the rear cover 230 in a shrink-fit manner, or may be a sliding cover that is slidably engaged with the rear cover 230 as shown in an example of FIG. 11. Referring to FIG. 11, the rear cover 230 is formed with a sliding groove 232, and the hangar cover 231 is inserted into the sliding groove 232. Accordingly, when the user pushes the hangar cover 231 with his or her finger along the sliding groove 232 as indicated by an arrow, the hangar part 210 becomes opened since the hangar cover 231 is slidably disengaged from the rear cover 230. Alternatively, by pushing in the opposite direction, the hangar part 210 becomes closed.

Figure 10:
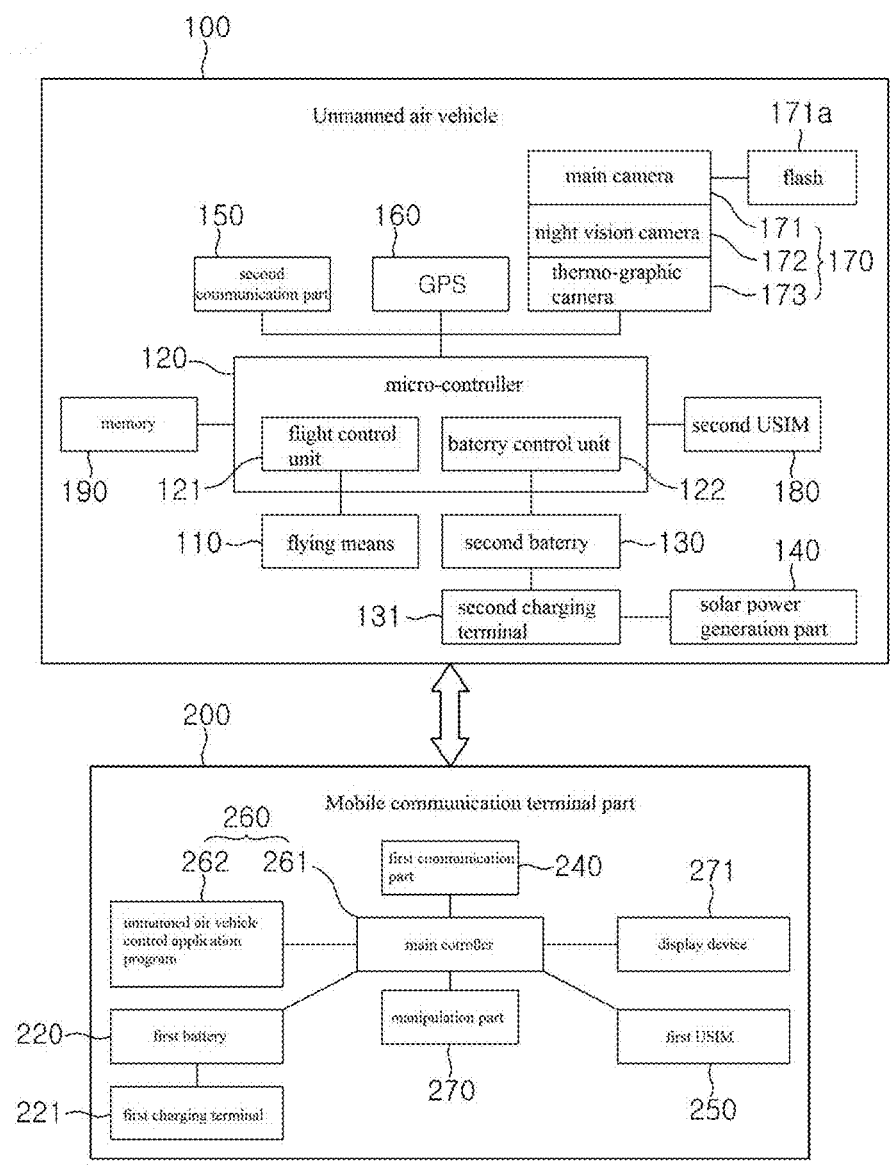
FIG. 10 is an example block diagram showing main configuration parts of the unmanned aerial vehicle and the mobile communication terminal part which constitute the embodiment of the present invention.

Meanwhile, a block diagram of FIG. 10 shows main configuration parts of the unmanned air vehicle 100 and the mobile communication terminal part 200 which constitute the embodiment of the present invention.

The unmanned air vehicle 100 includes a flying means 110 for navigating. The flying means 110 may be exemplified by a conventional propeller or a rotor (rotary blade). For example, the unmanned air vehicle 100 may be implemented by a quad-copter that is floated and propelled by four rotors. As is generally known, two rotors of the quad-rotor rotate clockwise, and the other two rotors rotate counterclockwise. In addition, postures and movements of the quad-copter may be controlled by controlling relative speeds of the four rotors. However, the unmanned air vehicle 100 of the present invention is not limited to a quad-copter, a multi-copter such as dual-copter, tri-copter, hexa-copter, octo-copter, and other various aerial vehicles that may be developed in the future may be used. It is preferable for the flying means 110 to be stored to face a main body of the mobile communication terminal part 200 rather than to face the rear cover 230 or the hangar cover 231 so that the flying means 110 does not make interfere with the rear cover 230 or the hangar cover 231 when being kept in the hangar part 210 of the mobile communication terminal part 200.

The unmanned air vehicle 100 includes a micro controller 120 that controls a flight, wireless communication, image capturing, battery controlling, and various operations (for example, chemical spraying of agricultural chemicals, air strikes during military operations, audio broadcasting, etc.) of the unmanned air vehicle 100. Particularly, the micro controller 120 includes a flight control unit 121 that controls the flying means 110. The flight control unit 121 controls an initiation of a rotation and a rotational speed of the flying means 110 so that the unmanned air vehicle 100 is floated and propelled according to a user's control. In addition, the micro controller 120 includes a battery control unit 122 that controls a second battery 130. The second battery 130 supplies electric power for driving the flying means 110 and for performing wireless communication, image capturing, and various operations.

The mobile communication terminal part 200 includes a first charging terminal 221 for charging the first battery 220, and the unmanned air vehicle 100 includes a second charging terminal 131 for charging the second battery 130. The second charging terminal 131 may charge the second battery 130 by receiving external power, the external power is divided for the first charging terminal 221 and the second charging terminal 131. In other words, the first battery 220 of the mobile communication terminal part 200 is charged by receiving external power through the first charging terminal 221, the external power is also supplied to the second charging terminal 131 when the unmanned air vehicle 100 is kept in the hangar part 210 of the mobile communication terminal part 200, thus the second battery 130 is also charged by the external power.

In addition, the unmanned air vehicle 100 autonomously includes a solar power generation part 140. The solar power generation part 140 may be provided in an upper surface of the unmanned air vehicle 100, and perform solar power generation to charge the second battery 130 while the unmanned air vehicle 100 navigates. Accordingly, the second battery 130 may be charged by the external power through the second charging terminal 131, or may be charged by the solar power generation part 140. The battery control unit 122 controls whether to use the external power or the solar power generation part 140 in order to charge the second battery 130.

The mobile communication terminal part 200 includes a first communication part 240 that performs conventional voice/text communication and data communication, and the unmanned air vehicle 100 also includes, as a wireless communication means, a second communication part 150 for receiving and transmitting control signals, response signals, and information with the mobile communication terminal part 200. The second communication part 150 may be a near field communication means such as Bluetooth that enables near filed communication, or a wireless communication means using a conventional mobile communication network. Alternatively, other means enabling wireless communication may be used without restriction.

The unmanned air vehicle 100 may include a global positioning system 160 (GPS) such that the unmanned air vehicle 100 may navigate by satellite navigation. In other words, the unmanned air vehicle 100 may receive flight positional information of the unmanned air vehicle 100 from the satellite by using the GPS 160 and transmit the received flight positional information to the mobile communication terminal part 200 through the second communication part 150. The user may recognize the flight positional information of the unmanned air vehicle 100 through the first communication part 240 of the mobile communication terminal part 200, and control the unmanned air vehicle 100. In addition, the unmanned air vehicle 100 may autonomously navigate according to a coordinate designation of the user by using the GPS 160.

The unmanned air vehicle 100 includes an image capturing means 170 for capturing images according to a user's control while navigating. The image capturing means 170 includes a main camera 171, a night vision camera 172, and a thermo-graphic camera 173. The main camera 171 may be a conventional digital camera, or a CCD camera or a CMOS type camera which is included in a mobile communication terminal. The main camera 171 captures general still images and videos. The unmanned air vehicle 100 may further include a flash 171a that is attached on the main camera 171 and provides a flash while capturing images. The main camera 171 and the flash 171a may be also used as a camera and a flash for the mobile communication terminal part 200 when the unmanned air vehicle 100 is kept in the mobile communication terminal part 200 so as to replace a camera and a flash provided in a conventional mobile communication terminal. The night vision camera 172 obtains images of a target object by using infrared light, and captures black-and-white images even at night using super sensitivity of ISO 102400 without any additional illumination. Thus, it is advantageous to obtain images of a target object that is difficult to identify at night. In addition, the thermo-graphic camera 173 is a camera that senses heat emitted from a target object and obtains thermal images according to a temperature difference of the target object. The thermo-graphic camera 173 may be useful for searching and rescuing human life underground, in caves or in man-made holes, or for detecting a part that is difficult to be visually recognized on the construction sites. The unmanned air vehicle 100 may include a memory 190 for storing images captured by the main camera 171, the night vision camera 172, and the thermo-graphic camera 173. When necessary, image date stored in the memory 190 may be transmitted to the mobile communication terminal part 200 according to a user's command.

Generally, the mobile communication terminal part 200 is equipped with a universal subscriber identity module (USIM) that stores individual information used for providing to a mobile communication subscriber various services such as authentication, charging, security functions, etc. (hereinafter, a first USIM 250). In response to the mobile communication terminal part 200, the unmanned air vehicle 100 may be equipped with a second USIM 180. Recently, with the commercialization of unmanned aerial vehicles, a number of unmanned aerial vehicles called 'drones' may navigate. Accordingly, legal conflicts and accidents may occur when an unmanned aerial vehicle whose user or owner is unknown crashes or intrudes into an unspecified area. Thus, it is preferable for the unmanned aerial vehicle to be equipped with information about the user or owner thereof. Accordingly, the unmanned air vehicle 100 of the present invention is equipped with the second USIM 180 as a USIM that stores subscriber information which matches with subscriber information of the mobile communication terminal part 200.

Figure 9:
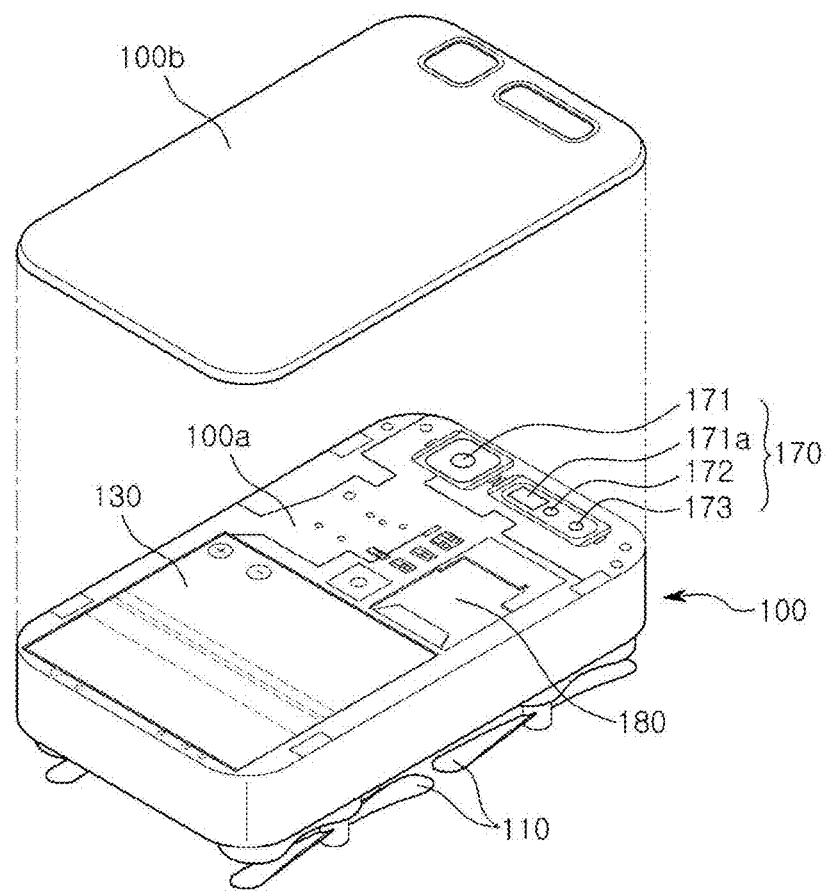
FIG. 9 is a perspective view showing the unmanned aerial vehicle of FIG. 5 with a bottom cover disassembled therefrom.

Meanwhile, as shown in FIG. 9, the unmanned air vehicle 100 may be engaged with a bottom cover 100b on a bottom part thereof so that the second battery 130, the second USIM 180 which are described above, and a circuit board 100a in which a description thereof is omitted are covered and are not damaged and exposed.

Further, the mobile communication terminal part 200 includes an unmanned air vehicle control means 260 controlling the unmanned air vehicle 100 to navigate, capture images, and perform other user's desired operations. The unmanned air vehicle control means 260 includes a main controller 261 that is usually included in a mobile communication terminal as a micro control unit. In addition, the mobile communication terminal part 200 includes an unmanned air vehicle control application program 262 that controls a flight, image capturing, and processing captured image data of the unmanned air vehicle 100. In addition, the mobile communication terminal part 200 includes a manipulation part 270 through which a user's control command is input to the unmanned air vehicle control means 260.

The manipulation part 270 includes a display device 271 displaying a touch screen on which various touch keys are arranged when the unmanned air vehicle control application program 262 is executed so that the user may control an operation of the unmanned air vehicle 100. In addition to the display device 271, the manipulation part 270 may further include a push button (not shown) that may be additionally provided in the mobile communication terminal part 200. The push button may be used when a feature phone is used as the mobile communication terminal part 200, rather than a smart-phone, a tablet-phone, or a tablet-PC.

Figure 1:
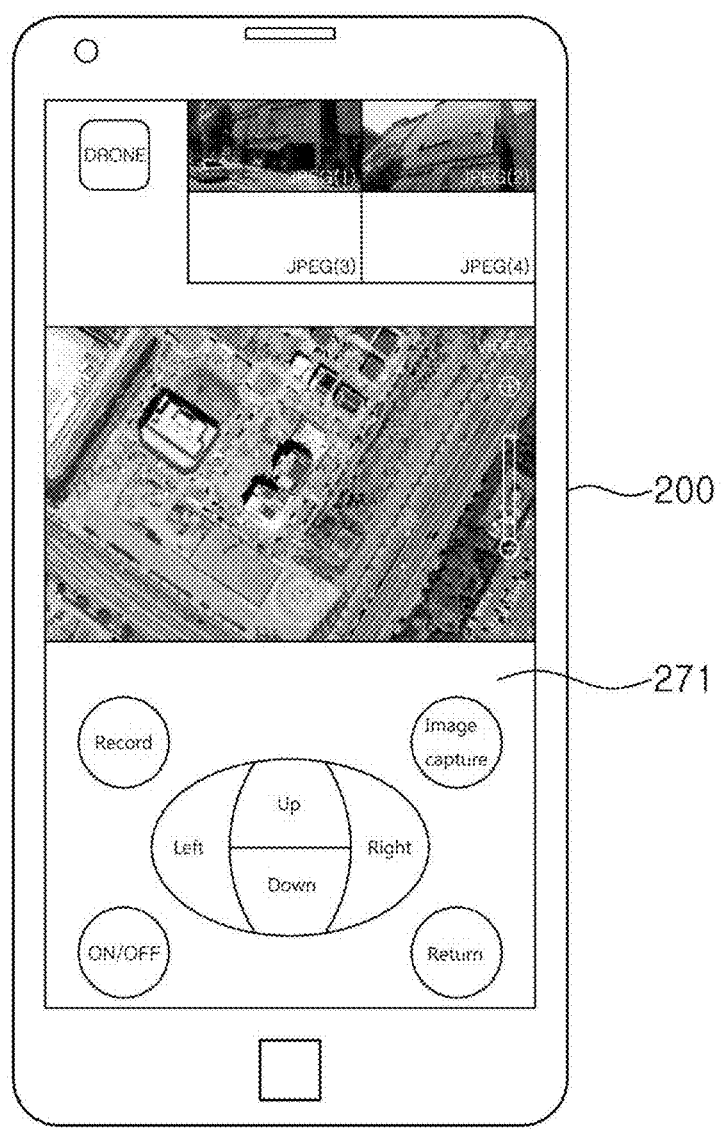
FIG. 1 is a view showing an example of a touch screen displayed on a front part of a mobile communication terminal part of an embodiment of the present invention.
Figure 2:
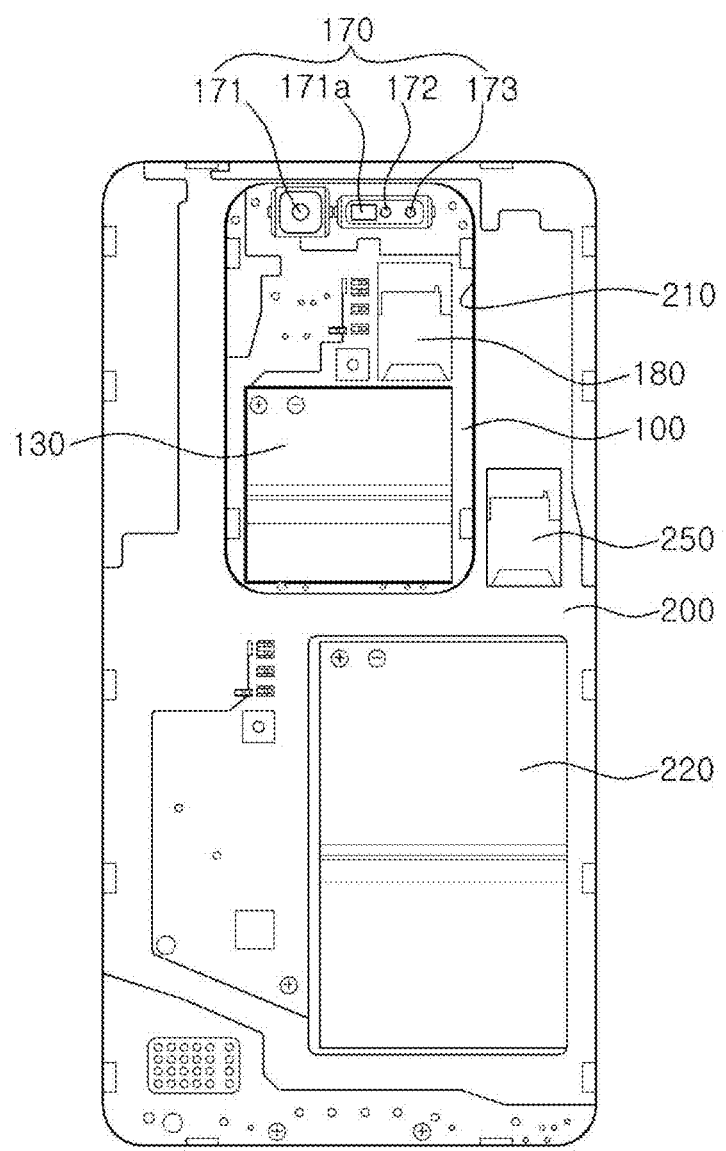
FIG. 2 is a rear view showing the embodiment of the present invention with a rear cover removed therefrom.
Figure 3:
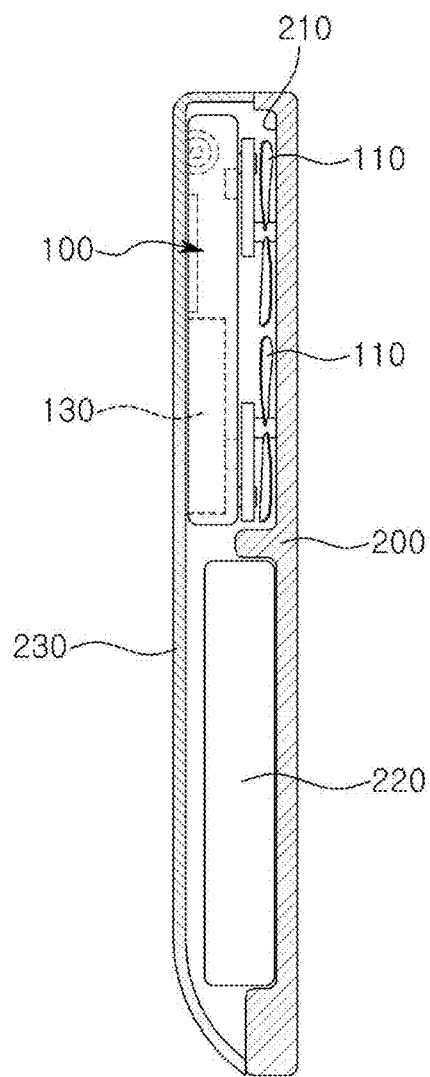
FIG. 3 is a side cross-sectional view of the embodiment of the present invention.
Figure 4:
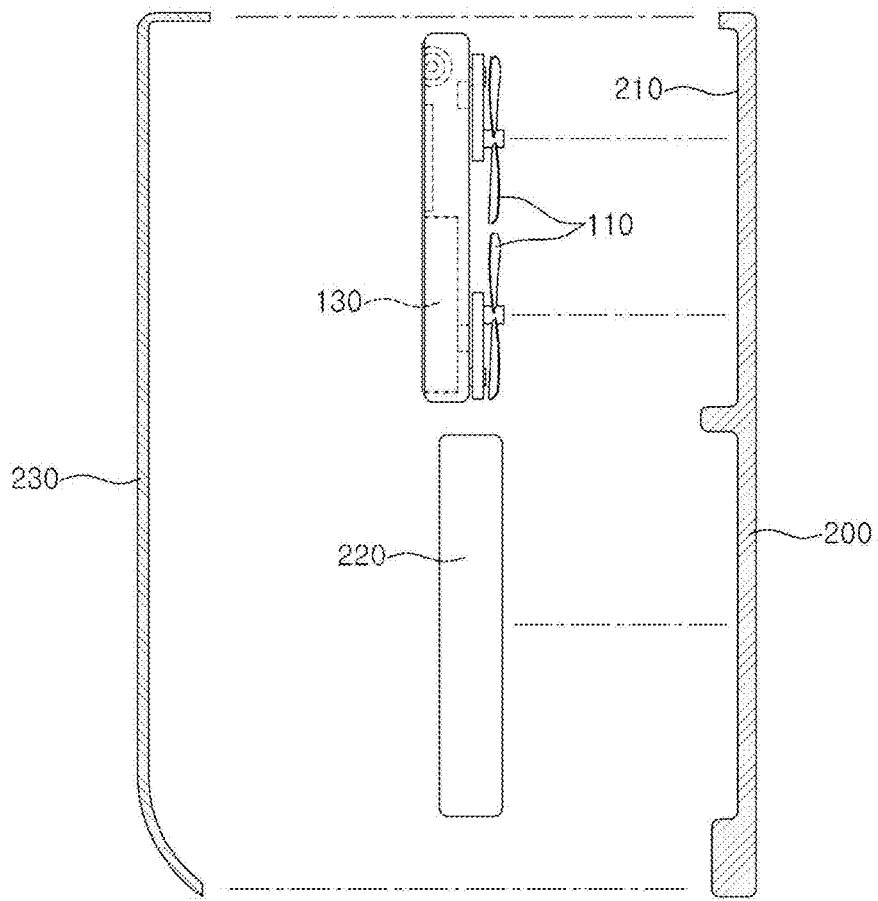
FIG. 4 is a view showing FIG. 3 in a disassembled state.
Figure 5:
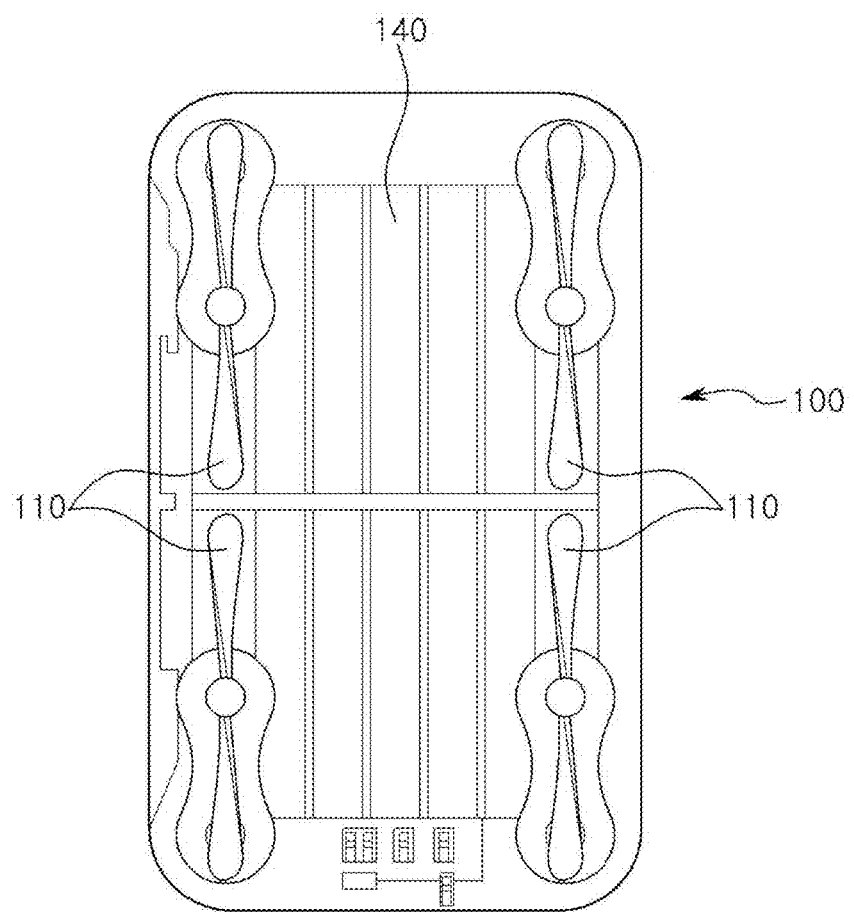
FIG. 5 is a plan view of an embodiment of an unmanned air vehicle provided in the present invention.
Figure 6:
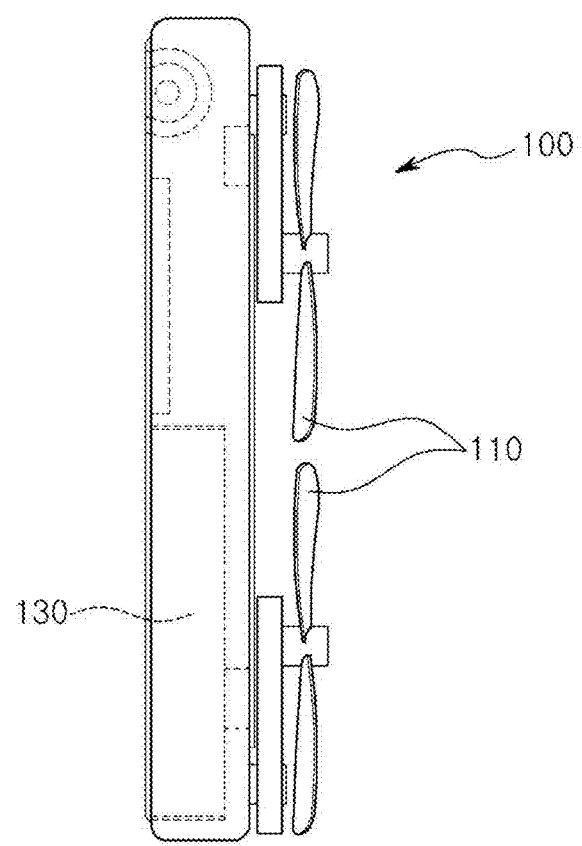
FIG. 6 is a side view of the unmanned air vehicle of FIG. 5.
Figure 7:
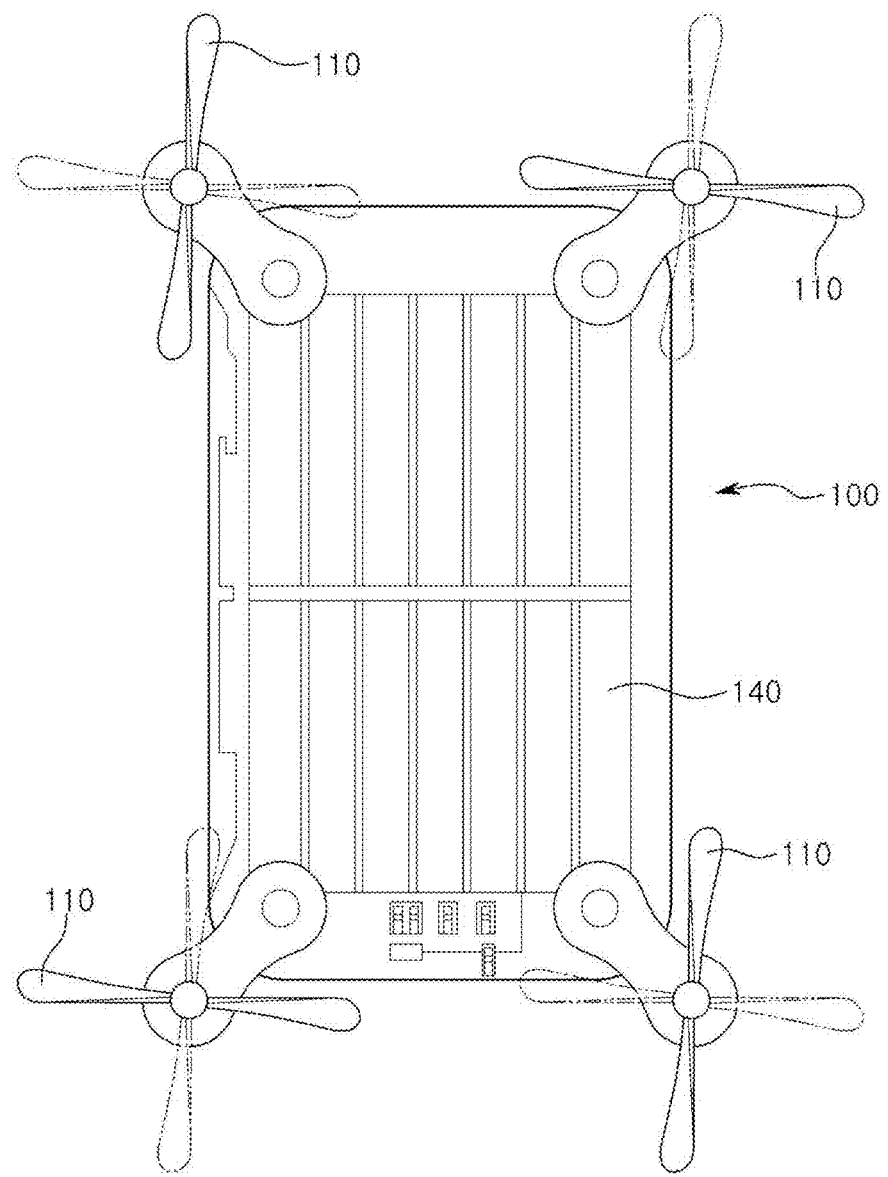
FIG. 7 is a view showing the unmanned aerial vehicle of FIG. 5 in which flying wings thereof have been spread.
Figure 8:
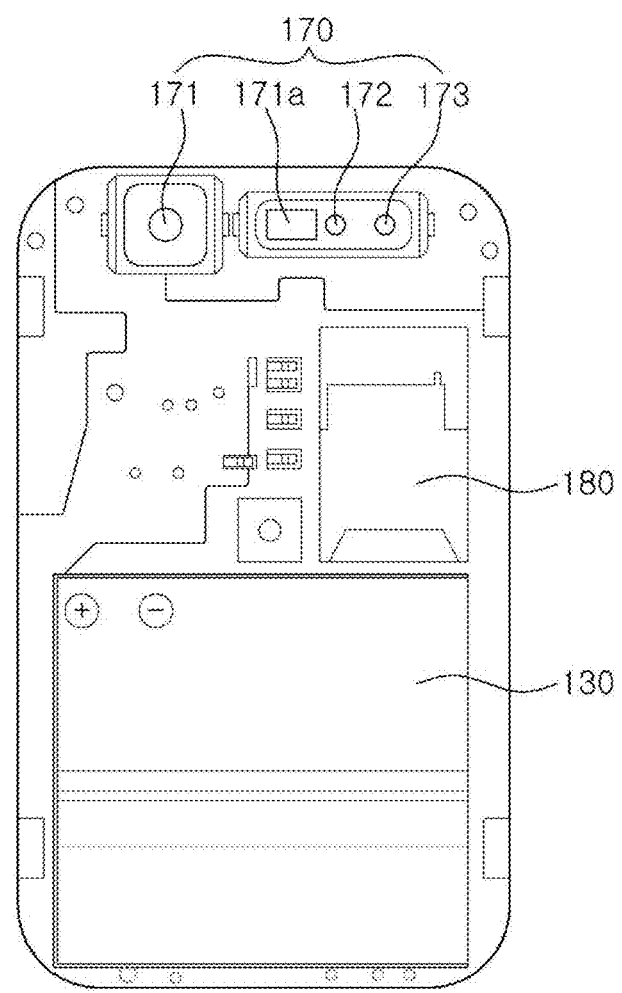
FIG. 8 is a bottom view of the unmanned aerial vehicle of FIG. 5.

As shown in FIG. 1, the unmanned air vehicle control application program 262 may be executed to display a touch screen on which various touch keys are arranged so that the user may control an operation of the unmanned air vehicle 100 through the display device 271 provided in a front part of the mobile communication terminal part 200. In other words, when the unmanned air vehicle control application program 262 is executed, touch keys for changing directions of flight to up, down, left, and right of the unmanned air vehicle 100, a touch key enabling the unmanned air vehicle 100 to capture images through the image capturing means 170, and a touch key forcing the unmanned air vehicle 100 to come back to the hangar part 210 of the mobile communication terminal part 200, are displayed on the display device 271. In addition, when the unmanned air vehicle 100 transmits a captured image to the mobile communication terminal part 200, the display device 271 may display the corresponding image. In addition, various touch keys and display screens displayed on the display device 271 may be variously modified according to a programming design of the unmanned air vehicle control application program 262.

Meanwhile, the unmanned air vehicle control application program 262 may be programmed such that the unmanned air vehicle 100 navigates according to a user's grasping such as tilting up and down, left and right, rather than being controlled through the touch screen displayed on the display device 271. As described above, the unmanned air vehicle control application program 262 may be variously programmed to implement an algorithm corresponding to user's manipulations which are necessary for performing a flight, image capturing, battery controlling, or other various operations (for example, chemical spraying of agricultural chemicals, air strikes during military operations, audio broadcasting etc.) of the unmanned air vehicle 100 rather than being controlled by the touch screen displayed on the display device 271.

In the above description of the mobile communication terminal having the unmanned air vehicle of the present invention, the present invention has been described in a manner of mainly concerning the structure and configuration in which the unmanned air vehicle 100 is kept in the mobile communication terminal part 200, and the features of the present invention which may be given to the unmanned air vehicle 100 when the unmanned air vehicle 100 is kept in the mobile communication terminal part 200. Accordingly, although descriptions of configurations usually and generally provided in the unmanned air vehicle 100 and in the mobile communication terminal part 200 (for example, a general flight mechanism of an unmanned air vehicle or a configuration related to a function of general communication/text message transmission or data communication of the mobile communication terminal) are omitted since they are not relevant to the features of the present invention, there is no problem in implementing the features of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mobile communication terminal comprising:
   an unmanned air vehicle including a flying means;
   a wireless communication means;
   an image capturing means;
   a mobile communication terminal part;
   a hangar part provided to receive the unmanned air vehicle;
   an unmanned air vehicle control means, being arranged inside of the mobile communication terminal, for controlling the unmanned air vehicle to navigate and for capturing an image by wireless communication communicated with the unmanned air vehicle; and
   a manipulation part through which a control command of a user is input to the unmanned air vehicle control means, wherein
   the hangar part is provided in a rear part of the mobile communication terminal part and the hangar part includes a rear cover which is arranged completely to cover the rear part of the mobile communication terminal part, the rear cover is provided to open and close the hangar part which is covered with the rear cover, and wherein a hangar cover is provided slidably to cover and open the hangar part along with a sliding groove.

2. The mobile communication terminal of claim 1, wherein the unmanned air vehicle further includes:

a battery supplying electric power to the flying means, the wireless communication means, and the image capturing means; and a solar power generation part charging the battery by solar generation.

3. The mobile communication terminal of claim 1, wherein the unmanned air vehicle further includes a universal subscriber identity module (USIM) storing subscriber information corresponding to mobile communication subscriber information of the mobile communication terminal part.

4. The mobile communication terminal of claim 1, wherein the image capturing means of the unmanned air vehicle includes at least one of a main camera capturing a general still image and video, a night vision camera obtaining an image of a target object using infrared light, and a thermo-graphic camera sensing heat emitted from a target object and obtaining a thermal image according to a temperature difference of the target object.

5. The mobile communication terminal of claim 1, wherein the unmanned air vehicle further includes a global positioning system (GPS) receiving flight positional information of the unmanned air vehicle and providing the received flight positional information to the mobile communication terminal part, and enabling the unmanned air vehicle to autonomously navigate according to a coordinate designation.

6. The mobile communication terminal of claim 1, wherein the unmanned air vehicle control means of the mobile communication terminal part includes an unmanned air vehicle control application program controlling a flight, image capturing, and processing captured image data of the unmanned air vehicle, and the manipulation part of the communication terminal part includes a display device displaying a touch screen for controlling the unmanned air vehicle when the unmanned air vehicle control application program is executed.

* * * * *